UNITED STATES PATENT OFFICE.

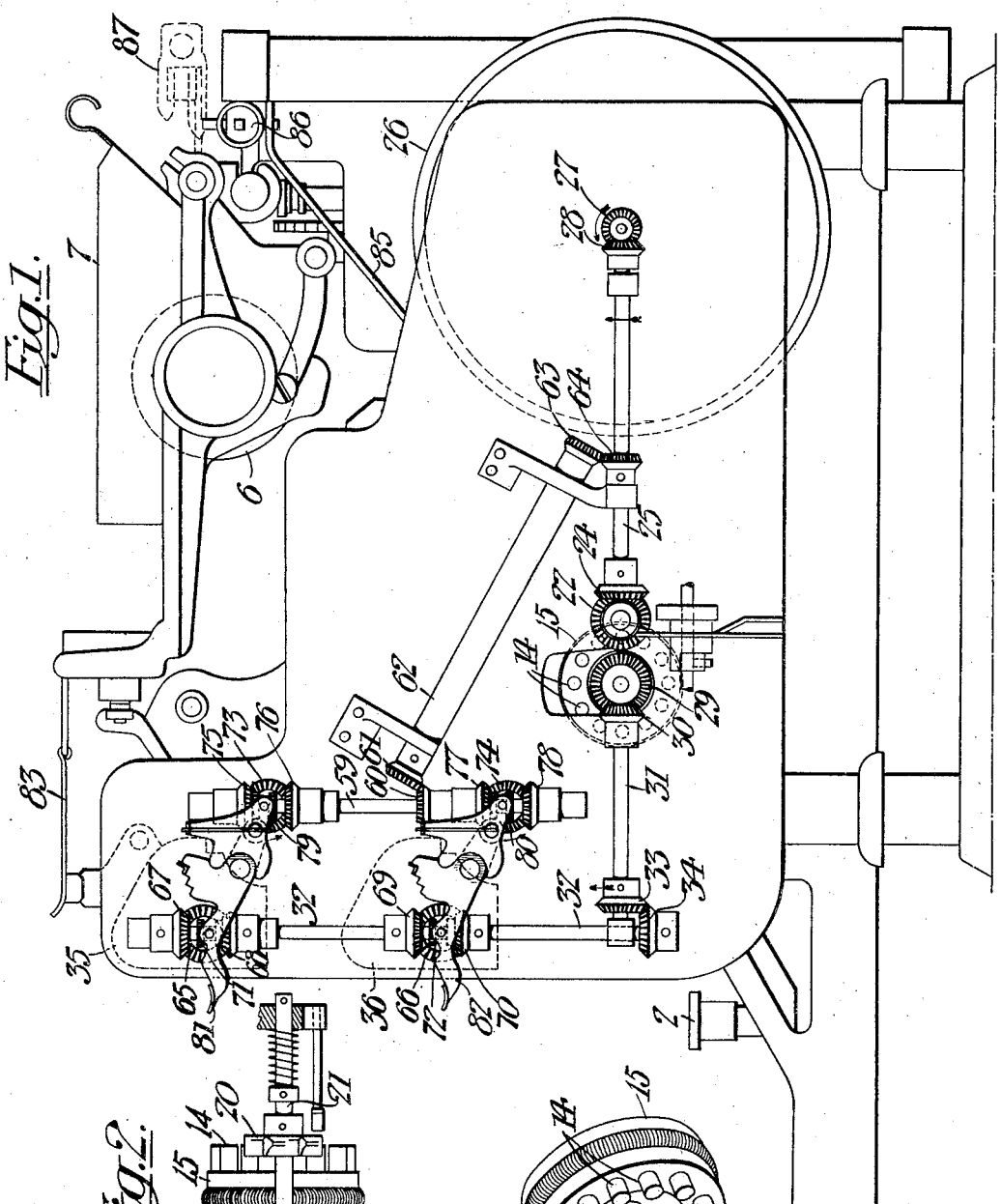

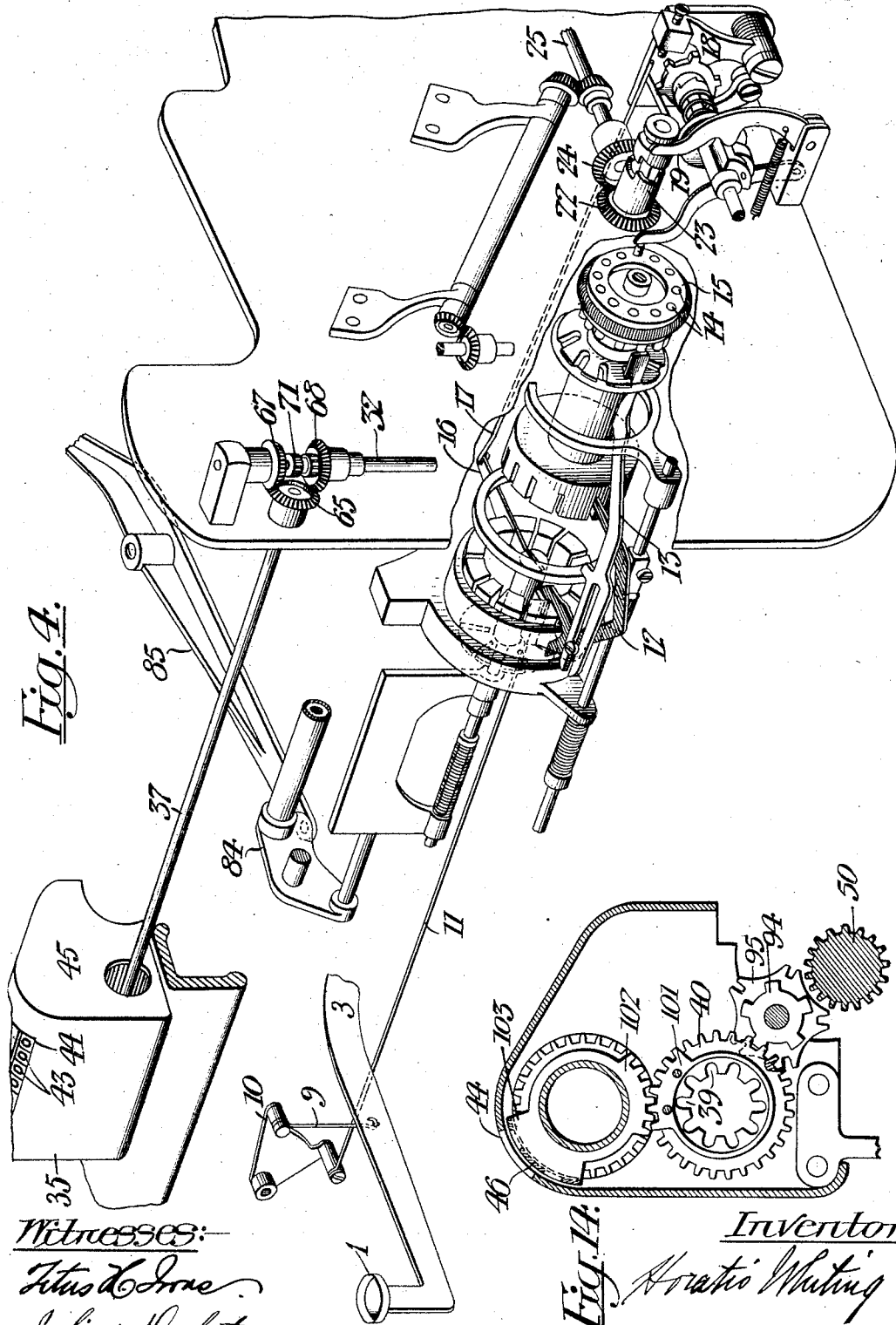

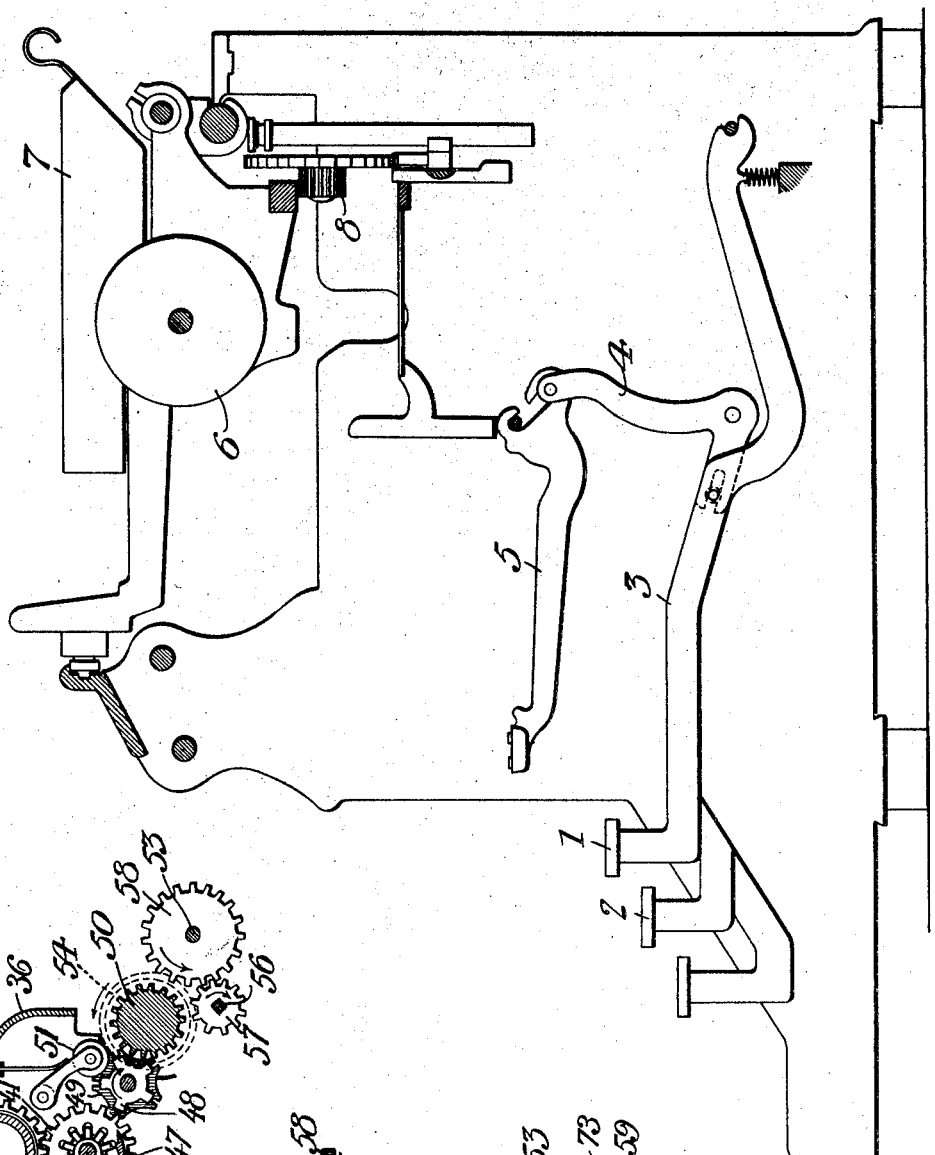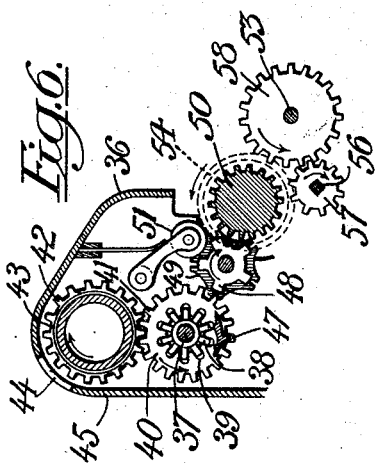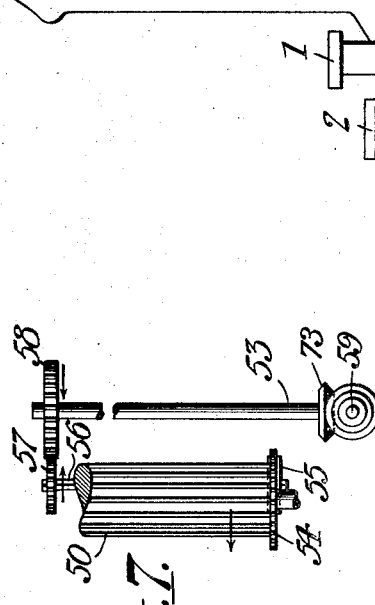

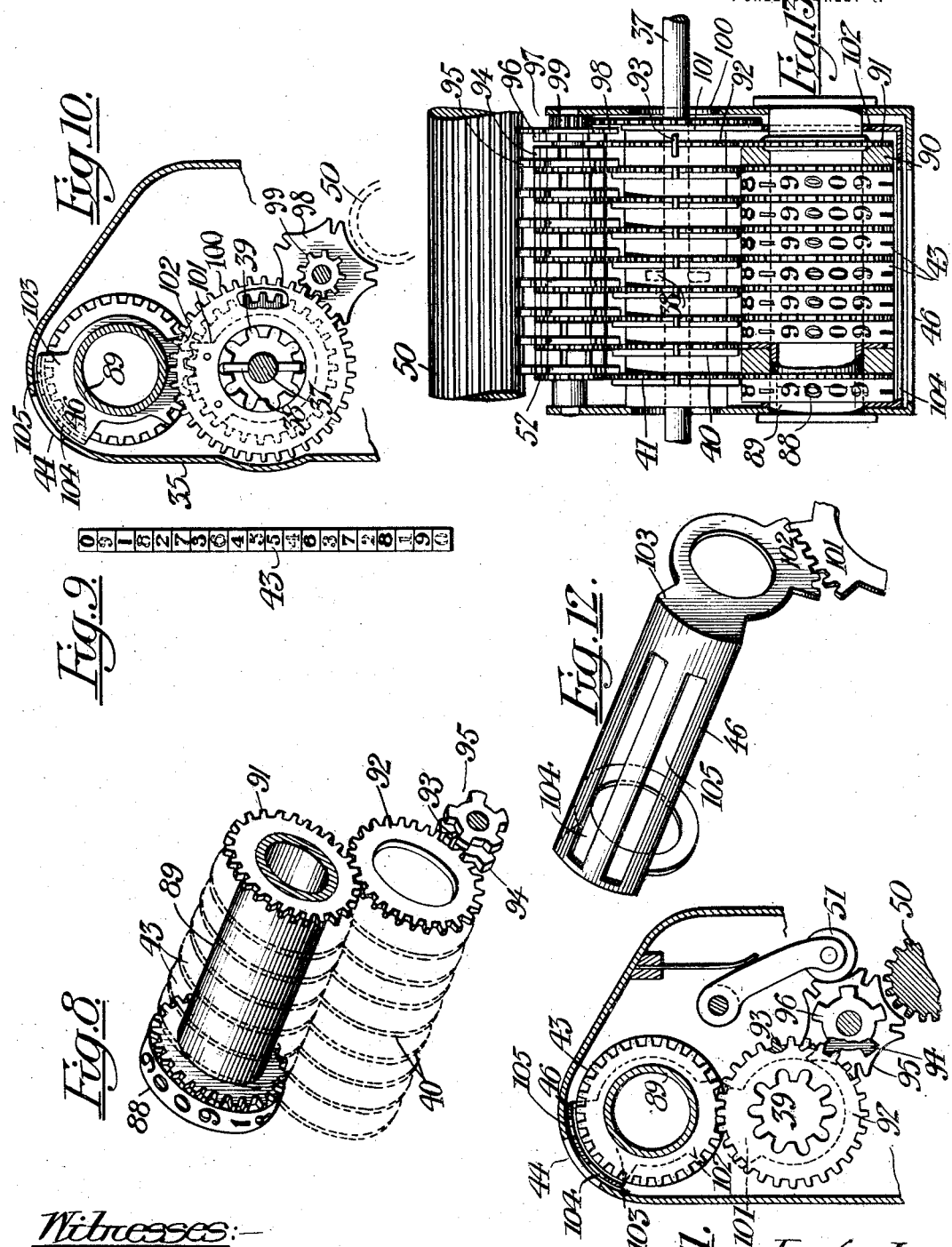

HORATIO WHITING, OF NEW YORK, N. Y., ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPEWRITING AND COMPUTING MACHINE.

1,389,234.   Specification of Letters Patent.   Patented Aug. 30, 1921.

Application filed May 6, 1914. Serial No. 836,693.

*To all whom it may concern:*

Be it known that I, HORATIO WHITING, a citizen of the United States, residing in New York city, in the county of New York and State of New York, have invented certain new and useful Improvements in Combined Typewriting and Computing Machines, of which the following is a specification.

This invention relates to a computing machine, more especially of the type in which algebraic summations may be made, and is an improvement on an application filed by Gustave O. Degener, on March 10, 1913, Serial Number 753,254, now Patent No. 1,261,107, dated April 2, 1918.

In some instances in the use of computing machines, it is necessary to make an algebraic summation, that is, to take from a smaller number exhibited in the register, a larger number, and obtain the algebraic difference. An example of this is when a person has a balance of, say, fifty dollars in the bank, and issues a check for some amount greater than this fifty dollars, say sixty dollars. The balance of the depositor being first run into the machine will show "50," and when the amounts checked out are run in, the check for 60 must of necessity be subtracted from this 50 exhibited. This will necessitate the overdraft of ten dollars to be shown by the register. To accomplish this purpose, the register computing wheels are each provided with two sets of digits running in opposite directions, and so that the sum of every two adjacent digits will equal "9." That is to say, the digits are arranged with their complements or co-digits adjacent each other.

When a larger number is subtracted from a smaller number exhibited, provision is made whereby, instead of one set of figures, say the positive figures which were originally visible or indicated, the second set of figures on the dial or computing wheels will be indicated or rendered visible. To do this, a shield or shutter mechanism may be provided, which will be shifted from indicating one set of numbers on the computing wheels to indicating the other set of numbers on the computing wheels, the numbers if desired, being distinguished from each other by being in different colors, such as black and red. This will occur whenever the computing wheel of highest denomination goes through zero in the reverse direction. That is to say, whenever the digits exhibited are being run backward in a decreasing direction, and the computing wheel of highest denomination is rotated so as to shift from "0" to "9" of the digit exhibited, then the shield will be shifted to exhibit the complementary set of numbers of those which were previously exhibited. This, however, will not give the absolutely correct result, as "1" is lost in the units wheel. This "1," known as the "fugitive 1," must be supplied every time the computing mechanism makes an algebraic summation of a larger number from a smaller exhibited by the register. To supply this "fugitive 1" in going through zero, advantage is taken of the passing through zero of the computing wheel of highest denomination.

In a non-algebraic register or totalizer, when the highest computing wheel passes through zero, there is no tens-carrying therefrom, as there is no computing wheel above the same in denomination. In the present instance, however, of an algebraic register or totalizer, whenever the computing wheel of highest denomination passes through zero in a decreasing direction of the digits exhibited thereby, a unit of rotation is carried therefrom. That is to say, a special wheel is provided below the units computing wheel, and connected in driven relation with the highest computing wheel, so that it will set off a special tens-carrying mechanism for the units computing wheel. This enables the tens-carrying mechanism, during its rotation, to kick in the extra unit, known as the "fugitive 1," to the units wheel. This same special wheel, operated by the computing wheel of highest denomination, also brings into play a special shifting mechanism in the nature of the other tens-carrying mechanisms, which is operated by the assisting shaft of the tens-carrying wheel, to throw the shutter or shield which determines which set of digits on the computing or dial wheels shall be exhibited or indicated.

In the present exemplification of the invention, the idea is adapted to a master wheel machine, and one in which the tens-carrying action takes place simultaneously with the computing action. There is provided a continuously rotating assisting shaft, which is depended upon to complete the tens-carrying action to the units wheel initiated, and complete the shifting of the shutter or shield mechanism, also initiated by the computing wheel of highest denomination as it passes through zero. In other words, in passing through zero, the shutter or shield will be simultaneously shifted with the kicking in of the extra unit or "fugitive 1" into the units wheel, so that the result exhibited will give the correct algebraic difference between the number exhibited and the number taken therefrom.

Other objects and advantages will appear hereinafter.

In the accompanying drawings,

Figure 1 is a view partly in elevation, taken from front to rear, with many parts removed for the sake of simplicity, and showing in general, the driving train from the motor to the master wheels and tens-carrying mechanisms. Such parts of the mechanism which are omitted from this view may be found in Fig. 3 of the application referred to above, Serial Number 753,254, on which the present case is an improvement.

Fig. 2 is a detail view of the valuating or index mechanism and the means for connecting the same in driven relation with the motor.

Fig. 3 is a detail view of the valuating or index wheel.

Fig. 4 is a skeleton perspective view, showing the means for traversing one of the master wheels, and the elemental connection from one of the numeral keys to the computing mechanism. Many parts omitted from this figure, for their relation to the parts disclosed may be found in Fig. 1 of the application No. 753,254, above mentioned.

Fig. 5 is a skeleton view in vertical section, taken from front to rear, showing the type action in general of the typewriting portion of this machine.

Fig. 6 is a vertical section taken through one of the computing heads, showing the tens-carrying mechanism in general.

Fig. 7 is a fragmentary plan view, with parts broken away to show the underlying structure, of the train of gearing to the tens-carrying assisting shaft.

Fig. 8 is a perspective view of one of the algebraic registers, showing the means whereby the computing or dial wheel of highest denomination enables the special action required by the present invention.

Fig. 9 is a developed view, showing the relation of the two sets of digits on the dial wheels, the full lines representing numerals in black, or positive numbers, and the dotted lines representing numerals in red, or the negative digits.

Fig. 10 is a detail view showing the mechanism for shifting the shutter or shield, with the shutter in a position corresponding to the showing of the positive or black numbers.

Fig. 11 is a vertical section, taken from front to rear, of one of the algebraic registers showing the mechanism for shifting the shield and for kicking in the extra unit in the units wheel, with the shield shown in its positive position corresponding to the showing of black or positive characters on the dial wheels.

Fig. 12 is a skeleton perspective view of the shutter or shield, whereby either set of black or red digits may be exhibited or indicated.

Fig. 13 is a developed plan view showing the relation of the dial wheels to their computing wheels, and the tens-carrying mechanisms therefor. The computing wheels which are normally under the dial wheels have been located off to one side in the development, so as to bring out more clearly the relation of the several trains to each other. This view shows the special tens-carrying mechanism which is brought in play by the dial wheel of highest denomination, and which kicks in or supplies the extra unit or "fugitive 1" for the units computing wheel, and which also brings into play the special shutter or shield-shifting mechanism, also operated in the manner of the tens-carrying mechanism.

Fig. 14 is a sectional view through the register, taken from front to rear, and showing the shield indicating or disclosing red numbers with the tens-carrying mechanism either just after the shield has been thrown in going from positive (black) figures to negative (red) figures, or just before shifting shield to show positive (black) figures from showing negative (red) figures.

Referring more particularly to the separate parts of this invention as embodied in the form shown in the drawing; numeral keys 1 (Fig. 5) and alphabet keys 2 press key levers 3 to rock bell cranks 4 to swing type-bars 5 up rearwardly against the front side of a platen 6 mounted to rotate on a carriage 7. The carriage 7 is arranged to travel from right to left under the pull of a spring barrel, not shown, and under the control of an escapement mechanism indicated at 8, which is operated each time one of the keys 1 or 2 is struck, to permit step-by-step movement of the carriage 7 so as to bring fresh portions of the work-sheet at letter-space intervals to the printing point of the typewriting mechanism.

Each of the numeral keys 1 in addition to operating the type action, draws down on a link 9 (Fig. 4) to rock a bell crank 10, which draws on a link 11, which in turn rocks a lever 12 to shift an interponent 13 in opposition to one of a series of index or valuating pins 14. The pins 14 are arranged in a circular series on a valuating or index wheel 15, which is for the purpose of determining or valuating the extent of action of the computing mechanism, to correspond with the particular value of the numeral key actuated. This mechanism is more fully described and shown in application No. 753,254, above mentioned, and reference may be had to said application for details of the invention not particularly pertinent to the present case. Sufficient to say, however, that each numeral key, as actuated, causes the rocking of a lever 16 which thrusts on a link 17 which is in the nature of a tripper arranged to disconnect a detent 18 so as to bring into play a supplementary operating mechanism or controlling mechanism 19. This controlling mechanism enables the setting of the opposite pin 15 to the interponent 13, which has been shifted to setting position, thereby determining the extent of rotation of the valuating wheel 15. It also enables the unsetting of the previously set pin 14, so as to complete the valuating wheel 15 at a point where a spur wheel 20 overlaps the pitch circle of the series of pins 14, forming a mutilated gear.

The spur wheel 20 is secured to a shaft 21 which may be driven from a bevel gear 22 when connected thereto by a clutch mechanism 23, which is also brought into action at the striking of a numeral key by the controlling mechanism 19. The bevel gear 22 is driven by a meshing bevel gear 24 on a shaft 25, which in turn is driven from a motor 26 by a pair of meshing bevel gears 27 and 28, the latter of which is secured to the shaft 25.

The arrangement of this mechanism is such that whenever a numeral key is struck it will set up one of the index or valuating pins 14 corresponding to its own particular value, and at the same time connect up the valuating wheel in driven relation with the motor 26, so that it will be rotated an amount corresponding to the particular numeral key struck. This particular rotation is transmitted by means of a bevel gear 29 (Fig. 1), and a meshing bevel gear 30, to a shaft 31, which in turn drives a shaft 32 through a pair of meshing bevel gears 33 and 34. The shaft 32 is arranged to drive the master wheel shafts of two or more totalizers or registers 35 and 36, either forwardly or backwardly, according to whether addition or subtraction action is going on. The register computing wheels may be rotated simultaneously in the same direction or in opposite directions.

Each master wheel shaft 37, of which there is one for each totalizer or register, is provided with a master wheel 38 (Fig. 6), which is arranged to engage an internal gear 39 of each one of a series of computing wheels 40, so as to drive said computing wheels *seriatim*. These computing wheels 40 are each provided with an external gear 41 which meshes with a corresponding gear 42 secured to a dial wheel 43. Each dial wheel 43 is provided with two sets of numbers arranged to be exhibited through a sight opening 44 in a computing head or totalizer casing 45. The numbers on the dial wheels are arranged in two series; one may be in red and the other in black. The numbers of the series alternate with each other, so that each black number is located between two red numbers, and vice versa. The black numbers ascend in one direction, as shown counter-clockwise, and the red numbers ascend in the opposite direction, as shown clockwise. The arrangement of the digits of this series of numbers with respect to each other is such that the co-digits or complements are arranged side by side, that is to say, for each pair of red and black digits when added together, their sum will give "9".

Ordinarily, while the sight opening 44 is large enough to disclose two digits at once, that is, a black and a red digit on each dial wheel, but one of such pair will be visible, because of a shield or shutter 46, which is located between the set of dial wheels and the sight opening 44. This shield or shutter acts as an indicating mechanism to point out or show one particular series of digits at a time, which digits may be all black, corresponding to a positive or credit number, or all red, corresponding to a negative or debit number.

For the purpose of carrying tens, that is, one complete revolution, from a lower computing wheel to a higher computing wheel, whether rotated in one direction or the other, there is provided on each computing wheel a special tens-carrying tooth 47. This special tens-carrying tooth, once in every revolution, whether rotating forwardly or backwardly, will engage a tooth of a five-toothed starting wheel 48 so as to shift this starting wheel, through a fraction of a revolution. This starting wheel 48 has secured, for rotation therewith, a mutilated gear 49, the mutilated portions of which are normally opposite an assisting barrel gear 50. When the master wheel is being rotated, this assisting barrel gear 50 will also be rotated so that, as the tooth 47 engages one of the teeth of the starting wheel 48, the teeth of the mutilated gear 49 will be moved within the sphere of rotation of the teeth of the gear 50. This gear 50 will then rotate the mutilated gear 49 through one-fifth of a revolution, when another mutilated portion of the gear 49 will come opposite to the barrel gear 50, interrupting the connections therebetween. The extent of throw is absolutely and positively determined by a spring-pressed detent roller 51 which engages between the mutilated portions of the mutilated gear 49, and limits its rotation to one-fifth of a revolution.

Also secured to the mutilated gear 49 there is provided a complete pinion 52, which meshes with the external gear 41 of the computing wheel of next higher denomination. That is to say, there is one of these sets of three gears, including a starting gear 48, a mutilated gear 49, and a pinion 52, between every two computing wheels from units to tens, tens to hundreds, hundreds to thousands, etc., so that when the units computing wheel rotates one complete revolution, this rotation will enable a carrying movement to the tens-computing wheel, amounting to one-tenth of a revolution, inasmuch as the ratio of the pinion 52 to the gear 41 is one to two. That is to say, tens will be carried in the case of adding, or borrowed in the case of subtracting, between lower and higher computing wheels when the lower computing wheel runs through a complete revolution.

The barrel gear 50 (Figs. 6 and 7) is driven in the case of each totalizer, computing head or register, from a shaft 53 through a train of gearing, including the meshing gears 54, 55, shaft 56, meshing gears 57 and 58, the latter of which is on the shaft 53. Each of the shafts 53 is arranged to be driven in one direction or the other, according to whether the master wheel shafts are driven in one direction or the other, and according to whether the operation is addition or subtraction, from a shaft 59 similar to the shaft 32. This shaft 59 is also driven from the motor 26 by means of a train of gearing, which includes a bevel gear 60 on the shaft 59, meshing with a bevel gear 61 on a shaft 62, which in turn is driven from the shaft 25 by means of meshing bevel gears 63 and 64.

In order to control the direction of rotation of the master wheel shafts 37 and the tens-carrying shafts 53, shifting mechanisms or reversing clutches are provided, one for each of the totalizers or computing heads 35, 36. That is to say, each master wheel shaft 37 is provided with a bevel gear, indicated respectively, in the case of the computing heads or totalizers 35 and 36, by the reference numerals 65 and 66. Loosely mounted on the shaft 32 and meshing with the gears 65 and 66 are two pairs of bevel gears, the members of each pair facing in opposite directions, so as to drive their respective corespondent in opposite directions. These pairs of bevel gears are indicated by the numbers 67, 68, 69 and 70.

To connect either member of the pair 67 and 68 in driven relation with the shaft 32, there is interposed between them a clutch 71 which is splined on the shaft 32 and shiftable to engage with corresponding clutch teeth on either the gear 67 or the gear 68, and which is also capable of occupying an intermediate neutral position connecting neither of the gears 67 and 68 in driven relation 32. The same arrangement is made in the case of the gears 69 and 70, which includes a shiftable clutch 72 splined on the shaft 32 and arranged to connect either of the gears 69 and 70 in driven relation with the shaft 32. It will thus be seen that the position of the clutches 67 and 72 determines individually whether the corresponding master wheel shaft and its master wheel is driven, and whether it is driven in one direction for addition or in the opposite direction for subtraction.

A similar arrangement is provided in the case of each of the tens-carrying shafts 53. That is to say, for the totalizer 35 there is provided on the drive shaft 53 a bevel gear 73, and for the totalizer 36 a bevel gear 74. These bevel gears are arranged to be driven alternatively by pairs of bevel gears 75 and 76, and 77 and 78, loosely mounted on the shaft 59 but clutchable thereto in driven relation therewith by a clutch 79 in the case of the pair 75 and 76, and a clutch 80 in the case of the pair 77 and 78. The direction of rotation of the master wheel and its tens-carrying mechanism for a totalizer is arranged to be altered simultaneously. For this purpose, the clutches 71 and 79 may be shifted simultaneously by a composite lever 81, which may occupy any one of three positions, corresponding to adding, neutral, and subtracting. The same is true of the clutches 72 and 80, which may be shifted simultaneously by a composite lever 82.

Provision is made for a relative movement between the computing wheels of each totalizer and its master wheel, so as to enable each master wheel as it is driven, to drive the computing wheels *seriatim* in correspondence with the writing of the digits in the successive denominational columns or letter-spaces as determined by the travel of the typewriter carriage. Any suitable means may be used to accomplish this purpose, such as that illustrated in application No. 753,254, above mentioned, in which the upper totalizer 35 is shown as traveling while its master wheel is stationary, and in which the lower totalizer 36 is shown as stationary with its master wheel traveling. In this arrangement, the casing of the upper totalizer is connected by a detachable latch 83 (Fig. 1) to the carriage 7, so that it will travel therewith as the latter moves step by step in a letter-feeding direction. In the case of the lower totalizer 36, the master wheel 38 is splined on its shaft 37 which is squared for this purpose. The master wheel is mounted for back and forth traversing movement on a special carriage or frame 84, so that while it will rotate with its shaft it may move step by step along its shaft so as to come *seriatim* into driving relation with each of the computing wheels. The back and forth movement of the special carriage 84 may be obtained by means of a lever 85, which is connected intermittently by a hook 86 to stops 87 carried by the carriage. By this arrangement the master wheel may be repeatedly vibrated back and forth during a single continuous movement of the carriage 7, so as to compute several numbers arranged in a horizontal line.

The operation of the mechanism thus far described is similar to that of application No. 753,254, which may be referred to for details not explicitly shown in this case. Considering this operation briefly, when a numeral key 1 is struck, it sets up a pin in the index wheel 15 corresponding to the value of the key struck; also this wheel will be completed at another point, where it will be driven by the spur wheel 20 from the motor 26 until the portion of the wheel just mutilated comes into conjunction with the spur wheel 20 when the driving will cease. When the numeral key is struck, it connects electrically a source of power to the motor 26, so that it will rotate, although it is normally silent. The connection of the index wheel to the motor is also controlled by the clutch mechanism 23. It will be noted that as soon as the motor is in action or electrically excited, it will drive the tens-carrying shafts, and thus the assisting barrel gear 50 continuously, so long as the motor is in action, irrespective of the fact that the index wheel 15 has ceased to rotate by the interruption of the connections between the valuating wheel and the spur wheel 20. That is to say, the tens-carrying assisting barrel gear 50 rotates an appreciable time subsequent to the stopping of the rotation of the master wheel, which is controlled by the valuating wheel 15. This enables the tens-carrying operation to be carried on after a computing wheel has set the tens-carrying mechanism by means of its special tooth.

We now come to the means whereby an algebraic summation may be made with either one or both of the totalizers 65 and 66, either simultaneously or separately, according to the character of computation being carried on thereby. Both of the totalizers may be algebraic totalizers. Inasmuch as the action is the same in each, that of only one will be described. If we are performing a normal adding operation, the black digits or numbers on the dial wheels will be seen through the sight opening 44 and through the shield 46. If the register exhibits any positive number by the black figures, say 10, and it is desired to subtract therefrom a number in excess thereof, say 20, then the shifting lever 81 or 82 of the particular totalizer, or both totalizers, if necessitated by the type of computation, will be shifted to the subtracting drive of such totalizer, and the numeral key 1 will be struck in the tens column. The tens computing wheel, exhibiting "1" in black, will be rotated backward two points (considering the black figures) so that first "0" and then "9" will come to the sight opening 44. This, however, will cause "1" to be borrowed from the hundreds wheel which will move back to "9", and the hundreds wheel in turn will borrow "1" from the thousands wheel, the thousands wheel in turn will borrow "1" from the tens of thousands, and so on throughout the whole series up to and including the computing wheel of highest denomination, so that there will be exhibited by the series of dial wheels the number —99999990—, the number of "9s" varying with the number of computing wheels. It will readily be seen that this is not the algebraic difference between plus 10 and minus 20, which should be minus 10. However, when the computing wheel of highest denomination goes through zero in this reverse direction, it in turn performs an abnormal tens-carrying operation, which sets in motion means for shifting the shield or shutter 46, and means for kicking in or adding in the extra "1" or "fugitive 1" to the units wheel. The dial wheel 43 of highest denomination, indicated in Fig. 13 by the special numeral 88, is secured to a sleeve 89, which is loosely mounted in the casing 45, so as to rotate therein. When the computing wheel and dial wheel of highest denomination, therefore, pass through zero, the sleeve 89 will in effect also pass through a position corresponding to zero.

Below the computing wheel of lowest denomination, that is, the units computing wheel, there is mounted a special spacing wheel 90, and below this there is secured to the sleeve 89 a gear 91, so as to rotate therewith; this gear meshes with and drives a corresponding gear 92 loosely supported below the computing wheel of lowest denomination. This gear 92 is arranged in series with the other computing wheels 40, but has no internal teeth, so that it can not be driven by the master wheel 38. It, however, has a double-acting special starting tooth 93, which, when the computing and dial wheels of highest denomination pass through zero, in the reverse direction of the numbers exhibited, will come into engagement with a starting gear 94 similar to the starting gears 48 but on a special group 95, including a mutilated gear 49 and a pinion 52, which latter meshes with the external gear 41 of the units computing wheel. That is to say, this special starting tooth 93 swings the group 95 so as to bring the mutilated gear 48 thereof into the sphere of operation of the assisting barrel gear 50, whereby an extra unit will be kicked into the units wheel in the direction of rotation of the computing wheel of highest denomination, as the latter's dial wheel passes through zero. This, then, provides for the "fugitive 1" essential in algebraic summations. In the particular example given, the units wheel, which did exhibit a black "0", will now exhibit a black "9", borrowing "1" from the tens wheel, which previously exhibited a black "9" and will now exhibit a black "8", so that the number exhibited *in toto* by the register or totalizer would be —99999989—.

The starting tooth 93, moveover, also engages a special starting wheel 96 of a group 97, which includes a mutilated gear 98 and a pinion 99. This group 97 is likewise shifted at the passing of the computing wheel of highest denomination through zero, so as to bring the mutilated gear 98 within the sphere of operation of the assisting barrel gear 50, so that as the latter rotates, it will rotate this group through one-fifth of a revolution. The pinion 99 meshes with a gear 100, the ratio between which is one to four, so as to drive the gear 100 through one-twentieth of a revolution. Secured for rotation with the gear 100 is a segment or gear 101 which meshes with and drives a segment 102 on one arm 103 pivotally supporting the shield or shutter 46. It is evident, then, when the computing wheel of highest denomination passes through zero, that it will initiate the movement of the group 97 so that this movement will be completed by the tens-carrying assisting barrel gear 50, which movement will be transmitted through the pinion 99, the gear 100, segment 101, and the segment 102, to the shield 46, so that the latter will be swung in the direction of the arrow in Fig. 11, one-twentieth of the circumference of the dial wheel. Normally a sight opening 104 will be in register with the sight opening 44, so that the black digits on the dial wheels will be exhibited. When, however, the conditions just mentioned take place, the shield 46 will be swung downwardly in the direction of the arrow in Fig. 11, so as to bring a second sight opening 105 in register with the sight opening 44 so as to disclose in place of the black figures which will be covered by the intermediate portion of the shield 46, the red figures, which will be the complement of those previously exhibited. Even if an endless cycle carryover is to be effected in passing through zero, the action will be complete and operative. It will be noted in this connection that each carry-over tooth 47 must pass through a tenth of a revolution in order to initiate a fifth of a revolution of each of the wheels 48. The work of continuing the rotation of the wheels 48 is taken up by the barrel gear 50. It will be seen then that each tens-carrying operation is a little later than the rotation of the dial wheel through zero, or, in other words, it may take two-tenths of a revolution to effect a carry-over operation of the wheels 48, 94, while it takes only one-tenth of a revolution of the dial wheels to start such carry-over operation. It is then evident in a series of eight or more dial wheels that the carry-over wheels and the barrel 50 may rotate at least sixteen-tenths of a revolution for a complete cycle carryover. Inasmuch as the greatest rotation which a dial wheel can have from the master wheel at any particular instant, is nine-tenths of a rotation, this would leave ample room for the driving action of a dial wheel by the master wheel to have finished before the carrying in of the fugitive "1" in an endless cycle is effective on this same dial wheel. In this type of machine, as will be seen by reference to application 753,254 above mentioned, the assisting barrel gear 50 rotates at least one complete revolution after the master wheel ceases to rotate, so that there is ample driving action for a complete cycle carryover. It should be understood that the time required to complete an endless cycle carryover may be affected by various factors, such as the relative speed of the master wheel and barrel gear 50, the back-lash of the gears, and the capacity of the totalizers.

In the case of the example cited, after the "1" had been cast into the units wheel, the following number would have been shown in black —99999989—. The shifting of the shutter will expose the complements, so that the following number would be disclosed or indicated in red on the register—00000010—. This, then, will give the correct algebraic difference between the positive or credit item 10 exhibited in the register, and the debit or negative item 20 subtracted therefrom, also showing, by the color of the figures, that there has been an overdraft.

If a deposit should now be made, which would be greater in extent than the negative balance shown, say, for example, forty dollars should be deposited, this deposit would be added in as a credit item. In doing this, the totalizer controlling lever 81 or 82 would be shifted for addition, and the "4" key struck in the tens column. The tens computing wheel would then go through zero in the opposite direction, so that the computing wheel of highest denomination would likewise go through zero in the opposite direction. This would initiate operation of the special tooth 93, so as to effect a tens-carrying operation to the units wheel in the opposite direction, casting in the "fugitive 1" and likewise shifting the shutter back to its adding position through the aid of the assisting barrel gear 50. The register would then disclose in black figures the algebraic difference between the minus 10 and the plus 40, which would be 30, the correct amount of the balance due to the depositor.

Variations may be resorted to within the scope of the invention, and portions of the improvements may be used without others.

Having thus described my invention, I claim:

1. The combination with a series of dial wheels, each having a plurality of sets of digits ranging in different manner, of tens-carrying mechanism enabling the translation of a complete rotation of any dial wheel of lower denomination to the next adjacent dial wheel of higher denomination either forward or backward, driving means for acting on each of said dial wheels, driving means for said tens-carrying mechanism acting simultaneously with the driving of each of said dial wheels, and tens-carrying mechanism for carrying a complete rotation of the dial wheel of highest denomination to a partial revolution of the dial wheel of lowest denomination.

2. The combination with a series of dial wheels, each having a plurality of sets of digits ranging in different manner, of tens-carrying mechanism enabling the translation of a complete rotation of any dial wheel of lower denomination to the next adjacent dial wheel of higher denomination either forward or backward, driving means for said dial wheels, driving means for said tens-carrying mechanism acting simultaneously with said driving means for said dial wheels, and tens-carrying mechanism for carrying a complete rotation of a dial wheel of higher denomination to a partial revolution of a dial wheel of lower denomination; said last-mentioned tens-carrying mechanism being driven simultaneously with the action of said driving means for said dial wheels from said driving means for said first-mentioned tens-carrying mechanism.

3. The combination with a series of dial wheels having positive and negative digits thereon, of means for driving said dial wheels either forwardly or backwardly, indicating means for pointing out one set of digits on said dial wheels to be read, said means moving to expose one set of digits and to obscure the other set, tens-carrying mechanism arranged to carry a unit to the dial wheel of lowest denomination, and means for simultaneously shifting said indicating means and operating said tens-carrying mechanism.

4. The combination with a series of dial wheels arranged to exhibit either one of two sets of co-digits, of indicating mechanism shiftable to indicate one or the other of the sets of co-digits, tens-carrying mechanism for transmitting complete rotation between dial wheels of lower and higher denominations, an assisting driving mechanism for said tens-carrying mechanism, and means for enabling the burden of shifting said indicating mechanism to be carried by said assisting driving mechanism.

5. The combination with a series of dial wheels having two sets of co-digits and driving means for said dial wheels, of indicating mechanism for pointing out one or the other of said sets of co-digits to be read, tens-carrying mechanism separate from said driving means for kicking in a unit in the units wheel, shifting mechanism for said indicating mechanism, and a starting tooth operated from the dial wheel of highest denomination for bringing into play simultaneously said tens-carrying mechanism for said units wheel and said shifting mechanism for said indicating mechanism.

6. The combination with a series of dial wheels having two sets of co-digits, of indicating mechanism for pointing out one or the other of said sets of co-digits to be read, tens-carrying mechanism for kicking in a unit in the units wheel, shifting mechanism for said indicating mechanism, a starting tooth operated from the dial wheel of highest denomination for bringing into play simultaneously said tens-carrying mechanism for said units wheel and said shifting mechanism for said indicating mechanism, and a common drive for actuating said tens-carrying mechanism and said shifting mechanism when simultaneously brought into play.

7. The combination with a series of dial wheels having two sets of co-digits, of indicating mechanism for pointing out one or the other of said sets of co-digits to be read, tens-carrying mechanism for kicking in a unit in the units wheel, shifting mechanism for said indicating mechanism, a starting tooth operated from the dial wheel of highest denomination for bringing into play simultaneously said tens-carrying mechanism for said units wheel and said shifting mechanism for said indicating mechanism, and a common drive for actuating said tens-carrying mechanism and said shifting mechanism when simultaneously brought into play, said common drive being independent of origin from said dial wheels.

8. The combination with a series of dial wheels having two sets of complementary digits thereon, and driving means for said dial wheels of indicating mechanism for pointing out one or the other of said sets to be read, tens-carrying mechanism between each wheel of lower denomination and the next higher wheel, tens-carrying mechanism from the highest dial wheel to the lowest dial wheel, shifting mechanism for said indicating mechanism operated from said last-mentioned tens-carrying mechanism, and a common drive separate from said driving means for simultaneously operating said last-mentioned tens-carrying mechanism and said shifting mechanism.

9. The combination with a series of dial wheels having positive and negative digits thereon arranged to make algebraic summation, of indicating mechanism for shifting to show one or the other of the sets of digits, tens-carrying mechanism to the dial wheel of lowest denomination, and a special starting tooth connected to be operated by the dial wheel of highest denomination arranged to bring into play said tens-carrying mechanism, said starting tooth being located below the dial wheel of lowest denomination.

10. The combination with a series of algebraic dial wheels, of a master wheel arranged to drive said dial wheels *seriatim*, tens-carrying mechanism arranged to carry from lower to higher denominations of said dial wheels, tens-carrying mechanism arranged to carry from higher to lower denominations of certain of said dial wheels, means for driving all of said tens-carrying mechanisms and a common source of power connected to operate said driving means and said master wheel simultaneously.

11. The combination with a plurality of algebraic registers, of a common source of power for driving said registers, valuating mechanism common to all of said registers, and individual controlling mechanism for enabling said source of power to rotate, under the control of said valuating mechanism, said registers in the same or opposite directions so that said registers may either simultaneously make algebraic summation, or one of said registers make arithmetical summation, and the other of said registers algebraic summation.

12. The combination with a plurality of algebraic registers arranged to compute algebraic sums, of a master wheel for each of said registers, tens-carrying mechanism for each of said registers, a drive common to all of said master wheels, a drive common to all of said tens-carrying mechanisms, a common source of power for actuating both of said drives, and controlling mechanisms, one individual to each of said registers and common to both the drive to the master wheel and the drive to the tens-carrying mechanism, for determining whether said registers shall concomitantly effect algebraic summation, or one effect an algebraic summation independent of the character of the computation carried on by another of the registers.

13. The combination with a series of dial wheels, of a series of computing wheels for driving said dial wheels, a special gear in series with said dial wheels arranged below the dial wheel of lowest denomination and connected to be driven by the dial wheel of highest denomination, a gear meshing with said gear and arranged in series with said computing wheels, a double-acting starting tooth on said last-mentioned gear, and tens-carrying mechanism for the computing wheel of lowest denomination brought into play by said starting tooth.

14. The combination with a series of dial wheels, of a series of computing wheels for driving said dial wheels, a special gear in series with said dial wheels arranged below the dial wheel of lowest denomination and connected to be driven by the dial wheel of highest denomination, a gear meshing with said gear and arranged in series with said computing wheels, a double-acting starting tooth on said last-mentioned gear, tens-carrying mechanism for the computing wheel of lowest denomination brought into play by said starting tooth, shutter mechanism for varying the elemental line of digits on said dial wheels visible to the operative, and shifting means for said shutter mechanism arranged to be brought into play by said starting tooth.

15. The combination with a series of dial wheels, of a series of computing wheels for driving said dial wheels, a special gear in series with said dial wheels arranged below the dial wheel of lowest denomination and connected to be driven by the dial wheel of highest denomination, a gear meshing with said gear and arranged in series with said computing wheels, a double-acting starting tooth on said last-mentioned gear, tens-carrying mechanism for the computing wheel of lowest denomination brought into play by said starting tooth, shutter mechanism for varying the elemental line of digits on said dial wheels visible to the operative, shifting means for said shutter mechanism arranged to be brought into play by said starting tooth, and a barrel gear common to both said tens-carring mechanism and said shifting means for operating the same simultaneously.

16. In an algebraic register, the combination of a plurality of order sets, driving mechanism for each order set, carry-over mechanism intervening between the sets, shutter mechanism for indicating the algebraic characteristic of a resultant, actuating mechanism for the order sets for causing the indicated resultant to be true and final, and means separate from said driving mechanism for causing operation of the shutter and operation of the actuating means simultaneously with the actuation of the order sets by the driving mechanism and by the carry-over mechanisms.

17. In an algebraic register mechanism, the combination of units, tens and higher order sets, driving mechanism for the sets, carry-over mechanism between the order sets, characteristic indicating mechanism controlled by the carry-over mechanism, and means for causing actuation of the units order set simultaneously with the operation of the characteristic indicating mechanism to cause the resultant indicated to be true and final.

18. In an algebraic register, the combination of a plurality of order sets, driving mechanism for each order set, carry-over mechanism intervening between the sets, shutter mechanism for indicating the algebraic characteristic of a resultant, carry-over mechanism to the order set of lowest denomination, and means for simultaneously shifting said shutter mechanism and operating said last-mentioned carry-over mechanism when the lower digit is taken from the smaller digit exhibited by the register with no digits of lower denomination exhibted in the register.

19. In an algebraic register, the combination of a plurality of order sets, driving mechanism for each order set, carry-over mechanism between each set of lower denomination and the next higher order set, and between the order set of highest denomination and the order set of lowest denomination, whereby said order sets may be connected in an endless cycle, shutter mechanism for indicating the algebraic characteristic of a resultant, and automatic means simultaneously carrying an endless cycle from one order set up through all higher order sets, around to the lowest order set, and up through all intervening order sets to the starting order set, and shifting said shutter mechanism to change the algebraic characteristic of a resultant.

20. The combination with a series of dial wheels, of an endless chain of gears capable of acting one from the other in a continuous cycle, and a boosting device extraneous to said gears for furnishing the power for the endless cycle action.

21. The combination with a series of dial wheels, of a master wheel for driving said dial wheels, carry-over mechanism from lower to higher denominations of the dial wheels and from the highest to the lowest denomination of the dial wheels, assisting mechanism for said tens-carrying mechanism, and a boosting mechanism for said assisting mechanism having a rotation continuing after the rotation of said master wheel has finished.

HORATIO WHITING.

Witnesses:
W. O. WESTPHAL,
JULIUS DUCKSTIN.